United States Patent [19]

Yoon et al.

[11] Patent Number: 4,622,265

[45] Date of Patent: Nov. 11, 1986

[54] POLYMER ALLOY FIBER AND PROCESS THEREFOR

[75] Inventors: Han Sik Yoon; Tae Won Son; Chul Joo Lee; Byung Ghyl Min, all of Seoul, Rep. of Korea

[73] Assignee: Korea Advanced Institute of Science and Technology, Seoul, Rep. of Korea

[21] Appl. No.: 699,726

[22] Filed: Feb. 11, 1985

[30] Foreign Application Priority Data

Jun. 29, 1984 [KR] Rep. of Korea .............................. 3721

[51] Int. Cl.$^4$ ............................................... D02G 3/00
[52] U.S. Cl. ....................................... 428/364; 428/373
[58] Field of Search ....................... 428/364, 373, 374; 525/432

[56] References Cited

U.S. PATENT DOCUMENTS

| 3,063,966 | 11/1962 | Kwolek et al. | 528/183 X |
| 3,869,429 | 3/1975 | Blades | 528/341 |
| 4,245,066 | 1/1981 | Nakagawa et al. | 525/432 |
| 4,278,779 | 7/1981 | Nakagawa | 525/432 |

Primary Examiner—Lorraine T. Kendell
Attorney, Agent, or Firm—Holman & Stern

[57] ABSTRACT

Ultrahigh tenacity, ultrahigh modulus fibers are provided. The fibers are prepared by dissolving a mixture of poly(phenyleneterephthalamide) polymer with an inherent viscosity of at least 5 and a regularly ordered aromatic-aliphatic copolymer with an inherent viscosity of at least 2 in concentrated sulfuric acid to form a spinning solution, which solution is subsequently subject to extrusion by a known per se dry-jet spinning process.

5 Claims, 3 Drawing Figures a: MOLECULAR CHAINS OF POLY(4,4'-TEREPHTHALANILIDEADIPAMIDE WHICH IS STRONGLY BONDED TO THE MOLECULAR CHAINS OF POLY (p-PHENYLENETEREPHTHALAMIDE)

b: MOLECULAR CHAINS OF ORIENTED POLY (p-PHENYLENETEREPHTHALAMIDE)

(A)

DEGREE (B)

DEGREE a: MOLECULAR CHAINS OF POLY(4,4'-TEREPHTHALANILIDEADIPAMIDE WHICH IS STRONGLY BONDED TO THE MOLECULAR CHAINS OF POLY(p-PHENYLENETERE-PHTHALAMIDE)

b: MOLECULAR CHAINS OF ORIENTED POLY(p-PHENYLENETEREPHTHALAMIDE)

POLYMER ALLOY FIBER AND PROCESS THEREFOR

BACKGROUND OF THE INVENTION

1. Field of the Invention

This invention relates to a ultrahigh tenacity, ultrahigh modulus polymer alloy fiber consisting of a wholly aromatic polyamide polymer and a regularly ordered aromatic-aliphatic copolyamide polymer.

2. Prior Art

When para-oriented wholly aromatic polyamide polymers, for instance, poly(p-phenylenephthalamide), poly(p-benzamide) and the like are dissolved in a tertiary amide solvent or concentrated sulfuric acid at a high level of concentration, they form liquid crystals. Particularly, when such polymers with a high degree of polymerization are spun in the liquid crystalline state, it is possible to obtain ultrahigh tenacity and modulus fibers. The techniques of this type were disclosed in U.S. Pat. Nos. 3,671,542, 3,869,429, and 3,869,430 and have now been industrialized. Their products also are commercially available.

The ultrahigh tenacity and modulus properties of para-oriented wholly aromatic polyamide fibers are considered attributed to the facts that the molecular chains constituting such fibers are in rigid rod-like forms and that the molecules of the fibers are extraordinarily well ordered in parallel as compared with those of the fibers with common flexible aliphatic molecular chains. These fibers with rod-like molecular chains exhibit very high tensile strength and modulus in the direction of the fiber axes but very low mechanical strength in the direction perpendicular to the fiber axes; this is due to the fibrillation of the fibers. The fibrillation is a severe drawback in para-oriented wholly aromatic polyamide fibers and, as mentioned above, is ascribed to the fact that the molecular chains of the fibers are in the rigid rod-like forms and have a fibril-like orientation. Thus, under conditions that a load or friction is repeatedly applied, the fibers are apt to be split into a number of individual fibrils, causing their tenacity and modulus deteriorated fatally. These defects may cause the use of ultrahigh tenacity and modulus fibers considerably restricted. Accordingly, many studies to improve the defects have worldwide been being made.

SUMMARY OF THE INVENTION

The object of the invention is to provide a polymer alloy fiber wherein conventional drawbacks have been eliminated.

The another object of the invention is to provide a process for preparing polymer alloy fiber by mixing more than two aromatic polymers to a polymer alloy and then subjecting it to spinning.

These and other objects can be attained by a process in accordance with the invention, comprising mixing 50-95% by weight poly(p-phenyleneterephthalamide) polymer with an inherent viscosity of at least 5 with 50-5% by weight a regularly ordered aromatic-aliphatic copolymer with an inherent viscosity of at least 2 having the formula:

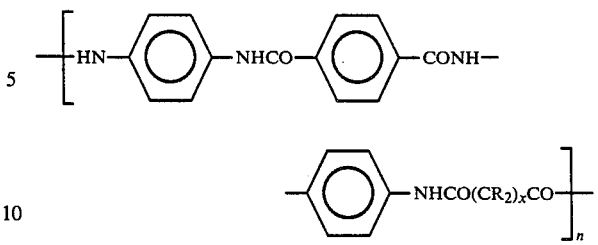

wherein x is 4, 6, 8 or 10 and R is H or $CH_3$, dissolving 14-24% by weight of the mixture of said polymers in concentrated sulfuric acid to afford a single phase of liquid crystalline polymer solution, extruding said solution at a temperature of 80°-100° C. by menas of conventional dry jet-wet spinning techniques to produce a fiber, the resulting fiber being coagulated and washed, and then subjecting the fiber to hot draw or heat treatment at a temperature of 200°-300° C.

The polymer alloy fiber of the invention surprisingly posseses a considerably increased crystalinity, molecular chain orientation property, mechanical properties such as tensile strength, modulus, and so forth as compared with its individual component fibers before being incorporated into the polymer alloy fiber and the fibrillation phenomena are highly restrained. This is considered similar to a matal alloy due to its having properties specifically improved by forming a fine structure of a new composition by virtue of thoroughly mixing two or more wholly aromatic polyamides chains in view of the molecular scale thereof.

In practicing the invention, the aromatic polyamides used include poly(p-phenyleneterphthalamide) which falls within the category of wholly aromatic polyamides, and poly(4,4'-terephthalanilideadipamide), poly(4,4'-terephthalanilidesuberamide), poly(4,4'-terephthalanilidesebacamide) or poly(4,4'-terephthalanilidedecanedicarboxamide) which falls within the category of aromatic-aliphatic ordered copolyamides. In producing the fibers by properly mixing the polymers, it is preferred to use 97-103% concentrated sulfuric acid as a spinning solvent and a dry jet-wet technique described in U.S. Pat. No. 3,414,645. The mixing ratio of the polymers is preferably in the range of 30-5% of one of the regularly ordered aromatic-aliphatic copolyamide polymers with respect to 70-95% of one of the wholly aromatic polymers. Most preferable fiber among those thus produced is a fiber essentially consisting of 85% poly(p-phenylenephthalamide) (I.V.=5.6) and 15% poly(4,4'-terephthanilideadipamide) (I.V.=3.50). In the case of a spurn fiber, this fiber may have the following physical properties: a tensile strength of 24 g/denier, a tensile modulus of 1020 g/denier, an elongation of less than 4.4%, and a crystal orientation angle of less than 13°. While, in the case of a drawn and heat treated fiber, the fiber may possess the following properties: a tensile strength of 27.6 g/denier, a tensile modulus of 1420 g/denier, an elongation of 3.3%, and a crystal orientation angle of 6°. Furthermore, the fibrillation in the latter fiber can considerably be restrained.

All of the fibers hitherto known are those consisting of a single linear crystalline polymer and thus this is an essential factor for the fibers such as industrial fibers which requires a high mechanical strength. Because, the orientation and the crystalinity of the matrix polymers must not be deteriorated due to the addition of a third material. In the fibers for use in clothing wears, a third polymer may often be added to the matrix polymers in order to endow the fiber with specific functions such as flexibility, flame-retardant property, and the like. However, in this case, it is not possible to prevent the physical properties of the matrix polymers from being deteriorated depending upon the amount of the third polymer to be essentially added. In the meanwhile, in accordance with the invention, two polymers A and B, which are entirely different from each other in their chemical components and molecular chain structures, were admixed in a proper proportion to give a new polymer system C, and thereby it was possible to obtain a new polymer alloy fiber which had substantially been improved in its physical properties as compared with a fiber consisting of only a single polymer A or B.

In accordance with the invention, the polymer A, which can be obtained following the process described in U.S. Pat. No. 3,063,966, may be poly(p-phenyleneterephthalamide) with rigid rod-like molecular chains having the formula:

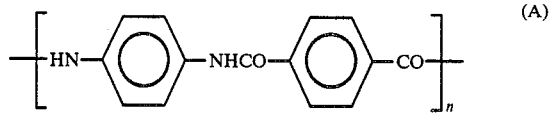
(A)

The polymer B may be poly(p-4,4'-terephthalanilidealkyldicarboxamide) having the formula:

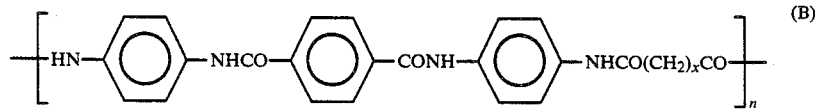
(B)

It will be noted that the polymer B has a molecle in the form of a size of short rods (three phenyl rings) being connected with a flexible string (an aliphatic chain forming a long molecular chain).

In the meanwhile, it has been found that these two polymers A and B are each dissolved in a solvent such as sulfuric acid to form a lytropic liquid crystal. When these two liquid crystals are mixed, they are substantially compatible and can afford a new single phase of liquid crystal at a given concentration and temperature. Therefore, it is possible to produce a single phase of spinning solution by dissolving both liquid crystals in a common solvent, i.e., sulturic acid, resulting in the formation of a polymer alloy fiber from the spinning solution. In practising the invention, a preferred mixing proportion of the two polymers A and B is in the range of about 30% of the polymer B by weight with respect to the polymer A, and more preferred proportion is in the range of 10-20% by weight. Furthermore, in order to obtain a high performance fiber, it is preferred to use the polymer in the ration of 15% by weight of the polymer B wherein x is 4 with respect to the polymer A. The spinning solution may be sulfuric acid at a 90-103%, most preferably 99.9% concentration. It may also be possible to use chlorosulfonic acid for the same purpose.

The concentration of the polymers appropriate for preparing a spinning solution of an optically anisotropic single phase by dissolving the two polymers A and B in a solvent is in the range of 14-24% by weight. The concentration may, within the range, be variable depending upon the polymerization degree of each of the polymers involved. That is, the concentration may be controlled in such a range that the mixed polymers have a viscosity appropriate for extruding at a temperature of 90° C. enabling the polymers to be stable in concentrated sulfuric acid. Most preferred range of the concentration is 18-20% by weight. Although a preferred rang of the temperature at which the mixed polymers are to be dissolved in concentrated sulfuric acid is 60°-120° C., this range must be variable depending upon a period of time required for dissolving the polymers in the solvent. In other words, at a higher temperature, the dissolution must be completed within a shorter period of time. The spinning solution of the anisotropic single phase thus prepared is apt to be solidified at a temperature of less than 60° C. and, therefore, the solution can not be used directly for subjecting to extrusion. Accordingly, the procedures such as transportation and filtration of the solution prior to subjecting to extrusion and subsequent spinning-extrusion must be carried out at a temperature of about 80°-100° C. In achievement of the objects of the invention, the spinning process may be carried out by a dry jet-wet spinning technique, which is in a greater detail described in U.S. Pat. No. 3,414,645. This technique was devised so that a liquid crystalline spinning solution is jet-stretched in a short distance space defined between a spinneret and a coagulation liquid bath. Usually, the dimension of the space may be about 10-30 mm. The polymer molecles are ordered in parallel during passing through the space and fixed as they are after entering the coagulation bath. In accordance with the invention, the jet-stretch ratio will vary from about 1 to 10 times.

The fibers prepared in accordance with the invention are found to have high heat resistance, high solvent resistance and high chemical resistance and, after spinning, the following physical properlies are demonstrated: a tensile strength of at least 20 g/denier, a tensile modulus of at least 1000 g/denier, an elangation of less than 10%, and an orientation angle of less than 16°. Furthermore, it should be noted that in these fibers no defects have not been found to be split or spread out on their surfaces.

BRIEF DESCRIPTION OF THE DRAWINGS

The invention will in more detail be explained with reference to the accompanying drawings, wherein.

DETAILED DESCRIPTION OF THE INVENTION

Figure 1:
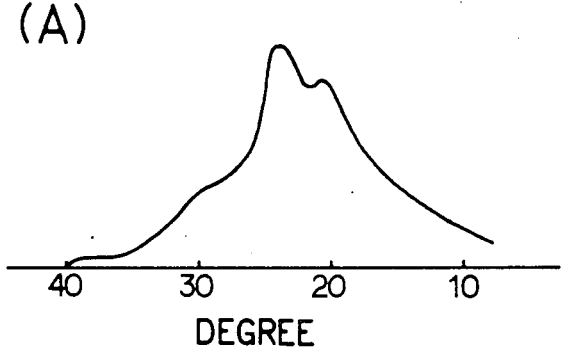
FIG. 1 is an intensity trace of an X-ray diffraction pattern of each of a poly(p-phenyleneterephthalamide) fiber A and a polymer alloy fiber B of poly(p-pheyleneterephthalamide) and poly(4,4'-phengleneterphthalanilideadipamide) (A:B=85:15% by weight), illustrating that the polymer alloy fiber has a superior degree of crystalinity and crystalline orientation.
Figure 1:
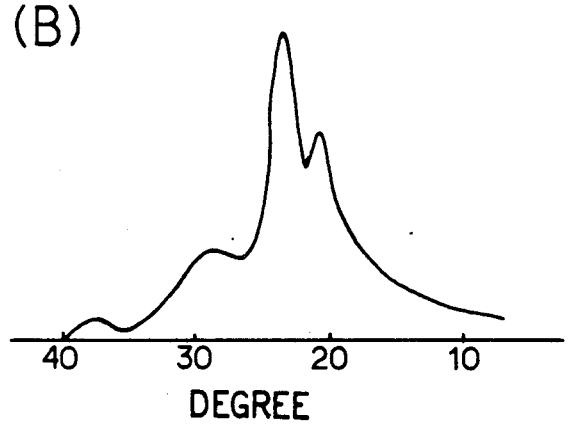
Figure 2:
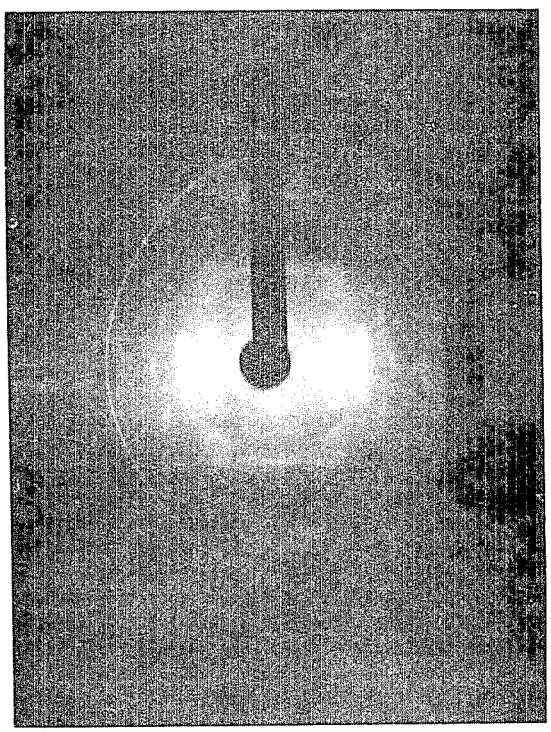
FIG. 2 is an intensity trace of an X-ray diffraction pattern after hot draw and heat treatment at a temperature of 300° C. of the polymer alloy fiber B of FIG. 1, illustrating that the intensity and the position of the major diffraction pattern are simillar with those of the poly(p-phenyleneterephthalamide) fiber A.

As can be seen from FIG. 1, the fibers of the invention demonstrate a specifically good crystalinity and a fine crystalline orientation even if the fibers did not undergo post-treatment such as hot draw. Further, as shown in FIG. 2, the fibers of the invention, which were treated by heat at a temperature of 300° C. for a short period of time, have the intensity and the position of the crystal diffraction pattern simillar with those of the crystal diffraction pattern of a rigid wholly aromatic polyamide, i.e., poly(p-phenleneterephthalamide).

Figure 3:
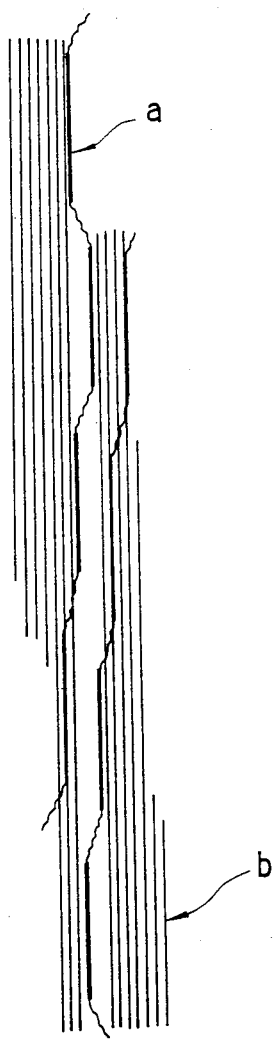
FIG. 3 is a model of an ideal molecular collective configuration of the polymer alloy fibers of FIGS. 1. and 2.

On the other hand, upon subjecting the fibers from the spinning process to hot draw at a temperature of 200°–400° C. to obtain an elogation ratio of less than 5.0% in accordance with the invention, the fibers can have the following physical properties: a tensile strength of 25–30 g/denier, a tensile modulus of 1300–1500 g/denier, an elongation of 3–4%, and an orientation angle of 5°–8°. From these properties, it is believed that in the fibers of the invention, the rigid molecular chains of wholly aromatic polyamides principally function as the factors to form a fiber, and the flexibly rigid molecular chains of aromatic-aliphatic polyamides facilitate to form such a fiber and to orient the chains. In other words, taking an high orientation state of the molecular chains in the fibers of the invention into consideration, it will be presumed that, as shown in FIG. 3, the rigid molecular chains of the wholly aromatic polyamides are ordered in parallel so as to form a high crystalinity of fine fibrils, and the rigid portion of the flexibly rigid molecular chains of the aromatic-aliphatic polyamides are concerned in forming a crystalline structure together with the wholly aromatic polyamides and the flexible portions enter into the positions between the fine fibrils so as to bind the fibrils.

A model of the molecular chains thus presumed may well be explained by aid of the physical properties of the polymer alloy fiber of the aromatic polyamides as shown in Table I below. Therefore, it will be understood that such fiber can have relatively superior mechanical properties. These salient characteristics have not been found from any of the studies hitherto conducted. Table I illustrates a comparison of various performances of a control fiber prepared in accordance with a conventional method and the fibers manufactured with varying the mixing ratio of their component polymers.

The invention will further be illustrated by the following examples but without limiting thereto the true sprit and the scope of the invention.

EXAMPLE 1

(1) Preparation of Poly(4,4'-terephthalanilideadipamide)

Into a 1 liter 4-necked, round bottom flask equipped with a thermometer, a stirrer, and nitrogen inlet and outlet tubes were placed 480 ml of dimethylacetamide, 19.2 g of LiCl and 20.76 g (0.06 mole) of 4,4'-diaminoterephthalanilide (This compound was prepared in accordance with the process described in Korean Pat. No. 11,475.). The mixture was heated at 80° C. with stirring to obtain a clear solution. The solution was cooled and maintained at 30° C. and, subsequently, 33.2 ml of pyridine was added to the cooled solution. Thereafter, 10.98 g (0.06 mole) of adipoyl chloride was slowly added to the mixture with vigorously stirring. At this point, the viscosity of the reaction system was progressively increased affording a highly viscoseous reaction mixture, and this mixture was slowly solidified upon continuation of stirring for more than 1 hour. This reaction mixture was air-tightly allowed to stand for at least one day and, then, the resulting polymer was precipitated by adding thereto an excess of water.

The mixture was filtered to collect the precipitates which were then washed with acetone and dried in a vacuum drying vessel at 80° C. to give 27.3 g of a pale yellow powdered polymer, I.V., 3.5.

(2) Preparation of Polymer Alloy Fiber (A:B=85:15)

A mixture of 34 g of poly(p-phenyleneterephthalamide) (I.V.=5.66; A) and 6.0 g poly(4,4'-terephthalanilideadipamide) (I.V.=3.45; B) was throughly dissolved in 160 g of 100% $H_2SO_4$ at 60°–90° C. to give a liquid crystalline spinning solution. This spinning solution was an optically anisotropic single phase at 90°–150° C., but an isotropic phase at higher than 150° C. The solution was extruded through a 0.06 mm diameter spinnrete with 12 holes while maitaining it at 90°–100° C., drawn 3.2 times at an air space and coagulated in a coagulation liquid bath (containing 25% $H_2SO_4$ solution) to produce a fiber. The fiber thus obtained was neutralized with $Na_2CO_3$, washed several times with water and dired. This fiber was of 1.1 denier and had the following properties: a tensile strength of 23.1 g/denier, a modulus of 1010 g/denier, an elongation of 4.6%, and an orientation angle of 16°. Inspection of the cross-sectional view of the fiber did not show any fibrillation thereon. Hot draw of this fiber at 300° C. (at a draw ratio of less than 5%) afforded the following properties: a tensile strength of 27.4 g/denier, a modulus

TABLE I

| Fibers | Non-hot drawn/Non-heat treated Fibers | | | | | | Hot drawn/Heat treated Fiberrs* | | | | | |
| --- | --- | --- | --- | --- | --- | --- | --- | --- | --- | --- | --- | --- |
| | T (g/den.) | E (%) | M (g/den.) | D (den.) | d (g/cm³) | O (deg.) | T (g/den.) | E (%) | M (g/den.) | D (den.) | d (g/cm³) | O (deg.) |
| Fiber from A | 19.2 | 5.4 | 845 | 1.1 | 1,410 | 21 | 20.4 | 4.5 | 943 | 1.1 | 1,418 | 16 |
| A:B = 95:5 | 20.4 | 4.7 | 870 | 1.1 | 1,414 | 16 | 22.0 | 4.3 | 984 | 1.1 | 1,420 | 11 |
| 90:10 | 23.1 | 5.0 | 962 | 1.2 | 1,415 | 14 | 25.2 | 3.7 | 1,380 | 1.1 | 1,421 | 7 |
| 85:15 | 24.0 | 4.4 | 1,020 | 1.1 | 1,421 | 13 | 27.6 | 3.3 | 1,420 | 1.1 | 1,425 | 6 |
| 80:20 | 21.2 | 5.2 | 970 | 1.1 | 1,411 | 13 | 26.4 | 3.4 | 1,305 | 1.1 | 1,423 | 8 |
| 75:25 | 19.8 | 5.5 | 922 | 1.2 | 1,407 | 16 | 23.7 | 4.2 | 976 | 1.1 | 1,417 | 9 |
| 70:30 | 18.7 | 5.3 | 819 | 1.3 | 1,405 | 18 | 20.1 | 4.7 | 932 | 1.2 | 1,410 | 12 |

*Draw ratio: 5%
T: Tensile Strength, E: elongation, M: modulus, D: denier, d: density, O: orientation angle
A: Poly(p-phenyleneterephthalamide) fiber, I.V. 5.66; B: Poly(4,4'-terephthalanilideadipamide) fiber, I.V. 3.45
[I.V. = A logarism viscosity of 0.5% polymer in 97% sulfuric acid (30° C.).]

of 1410 g/denier, an elongation of 3.1%, and an orientation angle of 6°.

EXAMPLE 2

(1) Preparation of Poly(4,4'-terephthalanilidesuberamide)

A poly(4,4'-terephthalanilidesuberamide) polymer was prepared, by a method similar to the process described in Example 1, except by reacting 20.76 g (0.06 mole) of 4,4'-diaminoterphthalanilide with 12.66 g (0.06 mole) of suberoyl chloride. This reaction afforded 28.9 g of the titled polymer, I.V., 2.84.

(2) Preparation of Polymer Alloy Fiber (A:B = 87.5:12.5)

A mixture of 35 g of poly(p-phenyleneterephthalamide) (I.V. = 5.07; A) and 5.0 g of poly(4,4'-terephthalanilidesuberamide) (I.V. = 2.84; B) was thoroughly dissolved in 160 g of 100% $H_2SO_4$ at 60°–70° C. to give a liquid crystalline spinning solution. This solution was extruded through a spinnrete while maintaining it at 90°–100° C., drawn 3.1 times at a short distance air space, and coagulated in a coagulation liquid bath. The resulting fiber was neutralized with $Na_2CO_3$, washed several times with water, and dried. The fiber thus obtained was of 1.2 denier and had the following properties: a tensile strength of 20.4 g/denier, a modulus of 984 g/denier, an elongation of 5.2%, and an orientation angle of 15°.

EXAMPLE 3

(1) Preparation of Poly(4,4'-terephthalanilidesebacamide)

A poly(4,4'-terephthalanilidesebacamide) polymer was prepared, by a method similar to the process described in Example 1, except by reacting 20.76 g (0.06 mole) of 4,4'-diaminoterephthalanilide with 14.34 g (0.06 mole) of sebacoyl chloride to give 30.6 g of the titled polymer, I.V., 2.7.

(2) Preparation of Polymer Alloy Fiber (A:B = 90:10)

A mixture of 36 g of poly(p-phenyleneterephthalamide) (I.V. = 5.24; A) and 4.0 g of poly(4,4'-terephthalanilidesebacamide) (I.V. = 2.72; B) was thoroughly dissolved in 160 g of 100% $H_2SO_4$ at 70°–80° C. to give a liquid crystalline spinning solution. This solution was extruded through a spinnrete while maintaining it at 90°–100° C., drawn at 3.0 times at a short distance air space, and coagulated in a coagulation liquid bath. The fiber thus prepared was neutralized with $Na_2CO_3$, washed several times with water, and dried. This fiber was of 1.1 denier and had the following properties: a tensile strength of 21.0 g/denier, a modulus of 892 g/denier, an elongation of 4.8%, and an orientation angle of 15°.

What is claimed is:

1. A polymer alloy fiber with ultrahigh tenacity and ultrahigh modulus which consists essentially of 50–95% by weight of poly(p-phenyleneterphthalamide) with an inherent viscosity of at least 5.0 and 50–5% by weight of a regularly ordered aromatic-aliphatic copolymer with an inherent viscosity of at least 2.0 having the formula:

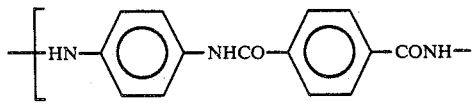

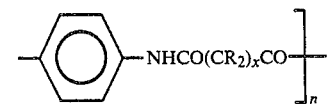

wherein x is an integer of 4, 6, 8 or 10, and R is H or $CH_3$.

2. The polymer alloy fiber as claimed in claim 1, wherein said aromatic-aliphatic copolymer is poly(4,4-terephthalanilideadipamide).

3. The polymer alloy fiber as claimed in claim 1, wherein said aromatic-aliphatic copolymer is poly(4,4'-terephthalanilidesuberamide).

4. The polymer alloy fiber as claimed in claim 1, wherein said aromatic-aliphatic copolymer is poly(4,4'-terephthalanilidesebacamide).

5. The polymer alloy fiber as claimed in claim 1, wherein said aromatic-aliphatic copolymer is poly(4,4'-terephthalanilidedecanedicarboxamide).

* * * * *